Figure 1:
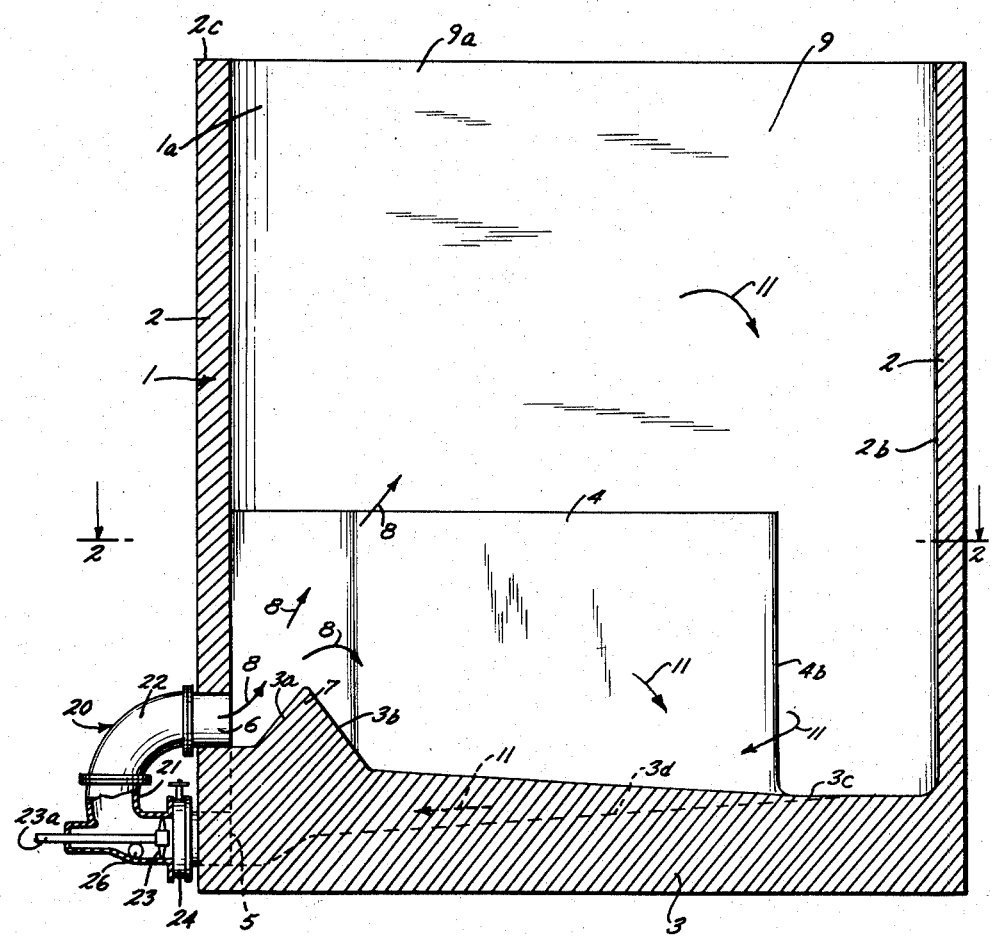

May 19, 1959 E. EGGER 2,887,306
CONTAINER CIRCULATION ARRANGEMENT
Filed Sept. 16, 1957 2 Sheets-Sheet 2

INVENTOR.
Emile Egger
BY Michael S. Striker
Attorney

United States Patent Office 2,887,306
Patented May 19, 1959

2,887,306

CONTAINER CIRCULATION ARRANGEMENT

Emile Egger, Cressier Pres Neuchatel, Switzerland

Application September 16, 1957, Serial No. 684,344

12 Claims. (Cl. 259—95)

The present invention relates to a container circulation arrangement, and more particularly to a container circulation arrangement in which a liquid is circulated in a container by a mixing pump located outside of the container so that the mixing pump returns completely mixed liquid into the container for circulation with the liquid in the container.

Container circulation arrangements according to the prior art have a mixing and circulating pump arranged within the container so that the liquid mixed by the mixing pump is discharged into the other liquid in the container at the outlet of the mixing pump, that is directly adjacent the inlet of the pump. Consequently, a thorough circulation of the entire liquid in the container is not assured, even if a partition wall is arranged between the inlet and the outlet of the mixing pump.

It is one object of the present invention to overcome the disadvantages of the container circulation arrangements according to the known art, and to provide a container having guide faces for assuring thorough mixing and circulation of all the liquid in a container.

Another object of the present invention is to provide a container circulation arrangement in which only liquid discharged from the mixing pump is pumped by another pump to be used for desired purposes so that only thoroughly mixed liquid is removed from the container.

Another object of the present invention is to provide a container circulation arrangement in which the container can be completely emptied, while all liquid removed from the container is fully and thoroughly mixed.

Another object of the present invention is to provide a container circulation arrangement in which the mixing pump has to overcome only a small pressure differential so that the arrangement can be economically operated.

With these objects in view, the present invention mainly consists in a container circulation arrangement which comprises, in combination, a container having wall means including a bottom and having an outlet located at the level of the lowest portion of the bottom and an inlet spaced from the outlet and mixing pump means for drawing through the outlet liquid from the bottom of the container and for pressing mixed liquid through the inlet and along an upwardly inclined guide face into the upper part of the container. By arranging the mixing pump in tubular means located outside of the container, the effective inlet and outlet openings can be arranged in such a manner as to produce the desired circulation in the container.

In the preferred embodiment of the present invention, the mixing pump includes an axial flow type rotary impeller constructed in such a manner as to produce mixing of liquid conveyed thereby, the impeller being located directly adjacent the outlet of the container. A pipe is connected to the tubular means downstream of the impeller so that only and exclusively mixed liquid can be pumped through said pipe means to a location at which such mixed liquid is required.

According to the preferred embodiment of the present invention a partition wall is arranged between the inlet and outlet and has an upright edge spaced from the wall of the container so that the liquid entering the container through the inlet passes about the remote edge of the partition wall and is forced to circulate in horizontal direction until reaching the outlet. Preferably, a guide face extends from the inlet for a short distance in upward direction so that the liquid pumped into the container tends to move in upward direction toward the surface of the liquid to circulate the upper layers of the liquid which are considerably higher than the inlet. However, since the outlet is located adjacent the bottom of the container the liquid is forced to move downward again toward the outlet whereby a thorough circulation and mixing within the container is assured.

Preferably, a downwardly inclined surface extends from the highest point of the upwardly inclined guide face around the remote edge of the partitioning wall and down to the outlet.

Figure 2:
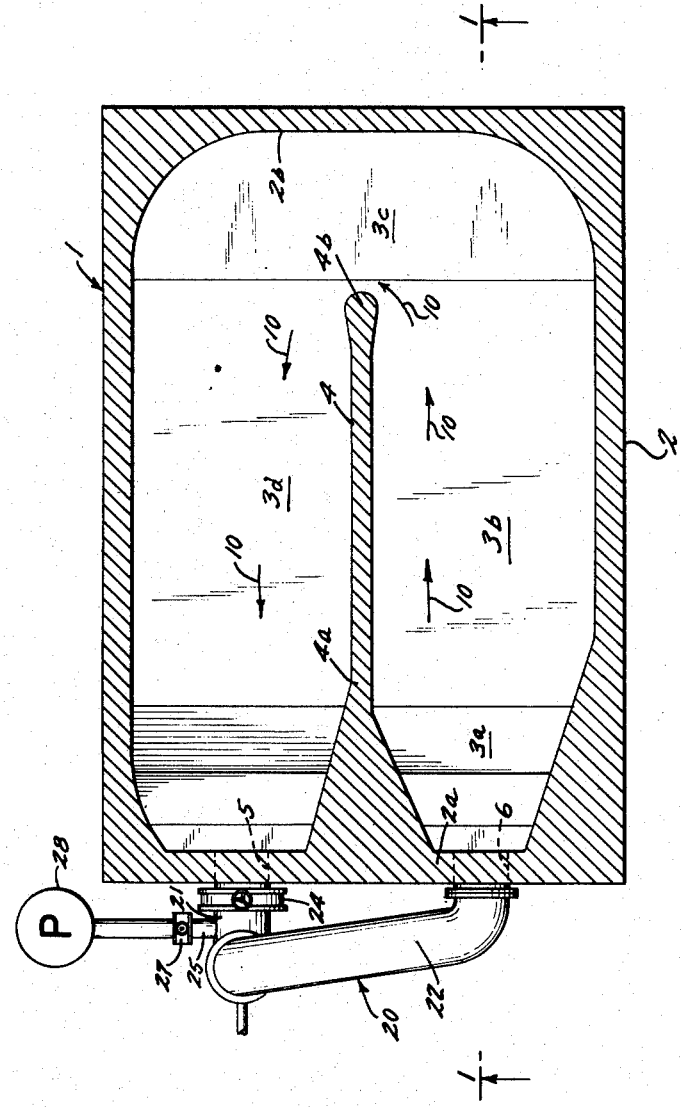

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a vertical section of an embodiment of the present invention taken on lines 1—1 in Fig. 2; and Fig. 2 is a horizontal section taken on line 2—2 in Fig. 1.

Referring now to the drawings, a container, vat or tank 1, which may be constructed of concrete, has upright wall means 2, and a bottom wall 3. A partitioning wall 4 is directly attached along an upright edge 4a thereof to a first portion 2a of the upright wall means 2, while the other upright edge 4b of the partitioning wall 4 is spaced from a second wall portion 2b of the upright wall means 2.

An outlet 5 is provided in the wall portion 2a on one side of the partitioning wall 4, and an inlet 6 is provided on the other side of the partitioning wall 4 in the wall portion 2a. Consequently, the outlet 5 is spaced from the inlet 6 in horizontal direction, but as best seen in Fig. 1, the inlet 6 is located above the outlet 5 and spaced from the same in vertical direction.

A guide means 7 is provided in the inlet part of the container and has an inclined guide face 3a which extends from the lower edge of the inlet 6 in upward direction so that liquid entering through the inlet 6 is deflected in direction of the arrows 8 toward the upper part 1a of the container and toward the surface 9a of a liquid 9 in the container. The top edge 2c of the upright wall means 2 may be located 8 or 9 feet above the inlet 6.

The guide face 3a is a surface portion of the bottom wall 3 of the container. Another surface portion 3b of the bottom wall extends in downward direction from the highest point of the surface portion 3a toward the edge 4b of the partitioning wall 4. A substantially horizontal surface portion 3c of the bottom wall 3 connects the downwardly inclined surface portion 3b with another downwardly inclined surface portion 3d of the bottom wall, which is located on the outlet side of the container. The lower edge of the outlet 5 is located at the lowermost point of the downwardly inclined bottom surface 3d. It is evident that the horizontal component of the stream of liquid from the inlet 6 to the outlet 5 will move in direction of the arrows 10 in Fig. 2. The circulating liquid will also have a vertical component which flows first in direction of the arrows 8 in Fig. 1 and then downwardly in the direction of the arrows 11 in Fig. 2.

A tubular means generally indicated by the reference numeral 20 connects the outlet 5 with the inlet 6. The tubular means 20 includes an arcuate tube 21 which is located in a vertical plane, and is connected by another tubular member 22 to the inlet 6.

An axial flow type impeller 23 is arranged in the lower portion of the tube 21 at the level of the outlet 5, and can be separated from the same by operation of a closure valve 24. The impeller shaft 23a is driven by a suitable motor, not shown.

The rotary impeller 23 is constructed in such a manner that the liquid conveyed by the impeller 23 separates from the trailing faces of the impeller vanes and is thoroughly mixed. The construction of the impeller 23 is, however, not an object of the present invention.

It is apparent that operation of the impeller 23 will draw liquid from the container through the outlet 5 and will press the liquid through the tubes 21 and 22 and inlet 6 into the container.

Consequently, the impeller mixes all the liquid passing through the tube 21, and returns such mixed liquid into the container so that the liquid in the container is circulated and after some time completely and thoroughly mixed.

The vertical distance between the inlet 6 and the outlet 5 may be two feet, and consequently the mixing and circulating pump means 23 has to overcome only a small pressure differential, while the particular construction of the container effects the circulation and mixing of the liquid in the container.

A pipe means 25 branches off from the tube 21 at the opening 26. Another closure valve 27 is arranged in the pipe means 25 for the purpose of separating a reversible 28 from the tubular means 20.

The arrangement is operated in the following manner:

The container 1 is filled by a liquid pumped by the pump 28 which is capable of overcoming the high pressure differential but conveys only a small volume of liquid. During the filling operation, the closure valve 27 is open, and the closure valve 24 is closed. When the container is filled, the closure valve 27 is closed, and the closure valve 24 is opened. Thereupon, the mixing and circulating impeller 23 is operated. As previously described, the liquid is drawn from the outlet part of the container through the outlet 5, thoroughly mixed by the mixing impeller 23, and returned through the inlet 6 at a speed of 5–6 meters per second into the container. The above-described guiding surface portions 3a, 3b, 3c and 3d, together with the partitioning wall 4 force the liquid in the container to circulate and mix with the homogeneous liquid returned by the impeller 23 through the inlet 6. When the liquid in the container is sufficiently mixed, the closure valve 27 is again opened, and the pump 28 is reversed and operated. Consequently, the liquid is drawn through the opening 26 by the pump 28, and since opening 26 is located adjacent the impeller 23 and downstream of the same, only mixed liquid can be removed from the container.

This arrangement is particularly advantageous as compared with the constructions of the prior art, since only liquid which has been thoroughly mixed by the impeller 23 can reach the pump 28, whereas liquid which may have separated into components while being in the container cannot enter the pump 28 before again being thoroughly mixed.

It will be understood that it is highly advantageous to remove a completely homogeneous mixture from the container.

A circulation container arrangement according to the present invention is used with great advantage in the paper industry. The pump 28 conveys a completely homogeneous mixture to the paper making machines as is highly desirable for obtaining high quality paper.

Another advantage of the present invention resides therein that the container can be completely emptied, since the outlet 5 is located at the lowermost point of the bottom surface of the container, so that the pump 28 is capable of pumping all the liquid out of the container through opening 26. However, even the last remnant of the liquid in the container is thoroughly mixed and rendered homogeneous by operation of the impeller 23.

It will be understood that each of the elements described above, or two or more together, may also find a useful application in other types of container circulation arrangements differing from the types described above.

While the invention has been illustrated and described as embodied in a container circulation arrangement in which a mixing pump is located outside of the container and returns thoroughly mixed liquid into the container through an inlet which is spaced in horizontal and vertical directions from the outlet of the container, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is new and desired to be secured by Letters Patent is:

1. Container circulation arrangement comprising, in combination, a container having wall means including a bottom, said wall means being formed with an inlet and an outlet, said outlet being located at the level of the lowest portion of said bottom, and said inlet being located spaced at least in horizontal direction from said outlet; an upright partitioning wall located in said container intermediate said inlet and outlet and having a top portion located above said inlet, said upright partitioning wall having an upright edge remote from said inlet and outlet and spaced from said wall means; guide means located in said container on the side of said partitioning wall at which said inlet is located, said guide means having a guide face extending from said inlet in upward direction along said partitioning wall; and mixing pump means communicating with said inlet and outlet for drawing through said outlet liquid from the bottom of said container and for pressing mixed liquid through said inlet along said guide face into the upper part of the container whereby liquid in the container is circulated and passes around said upright edge of said partitioning wall.

2. Container circulation arrangement comprising, in combination, a container having wall means including a bottom, said wall means being formed with an inlet and an outlet, said outlet being located at the level of the lowest portion of said bottom, and said inlet being located spaced in horizontal and vertical directions from said outlet above the same; an upright partitioning wall located in said container intermediate said inlet and outlet and having a top portion located below the top portion of said wall means and above said inlet, said upright partitioning wall having an upright edge remote from said inlet and outlet and spaced from said wall means; guide means located in said container on the side of said partitioning wall at which said inlet is located, said guide means having a guide face extending from said inlet in upward direction along said partitioning wall; said bottom having a guide surface on the side of said partitioning wall at which said outlet is located, said guide surface extending from said outlet in upward direction along said partitioning wall to said upright edge of said partitioning wall; tubular means located outside of said container and being connected to said inlet and outlet, respectively to connect the same; and mixing pump means located in said tubular means for drawing through said outlet liquid from the bottom of said container and for pressing mixed liquid through said inlet along said guide face into the upper part of the container whereby liquid in the container is circulated and passes around said upright edge of said partitioning wall and in downward direction along said guide surface of said bottom toward said outlet.

3. Container circulation arrangement comprising, in combination, a container having wall means including a bottom, said wall means being formed with an inlet and an outlet, said outlet being located at the level of the lowest portion of said bottom, and said inlet being located spaced in horizontal and vertical directions from said outlet above the same, said inlet being spaced a greater distance from the top of said wall means than from said bottom so that said inlet is adapted to be spaced a substantial distance from the surface of liquid in said container; an upright partitioning wall located in said container intermediate said inlet and outlet and having a top portion located below the top portion of said wall means and above said inlet, said upright partitioning wall having an upright edge remote from said inlet and outlet and spaced from said wall means; guide means located in said container on the side of said partitioning wall at which said inlet is located, said guide means having a first guide face extending from said inlet in upward direction along said partitioning wall, and a second guide face extending from the highest point of said first guide face in downward direction along said partitioning wall to said upright edge of said partitioning wall; said bottom having a guide surface on the side of said partitioning wall at which said outlet is located, said guide surface extending from said outlet in upward direction along said partitioning wall to said upright edge of said partitioning wall and to the horizontal level of the lowest portion of said second guide face of said guide means; tubular means located outside of said container and being connected to said inlet and outlet, respectively, to connect the same; and mixing pump means located in said tubular means for drawing through said outlet liquid from the bottom of said container and for pressing mixed liquid through said inlet along said guide face into the upper part of the container whereby liquid in the container is circulated and passes around said upright edge of said partitioning wall and in downward direction along said guide surface of said bottom toward said outlet.

4. Container circulation arrangement comprising, in combination, a container having wall means including a bottom, said wall means being formed with an inlet and an outlet, said outlet being located at the level of the lowest portion of said bottom, and said inlet being located spaced in horizontal and vertical directions from said outlet above the same, said inlet being spaced a greater distance from the top of said wall means than from said bottom so that said inlet is adapted to be spaced a substantial distance from the surface of liquid in said container; an upright partitioning wall located in said container intermediate said inlet and outlet and having a top portion located below the top portion of said wall means and above said inlet, said upright partitioning wall having an upright edge remote from said inlet and outlet and spaced from said wall means; guide means located in said container on the side of said partitioning wall at which said inlet is located, said guide means having a guide face extending from said inlet in upward direction along said partitioning wall; tubular means located outside of said container and being connected to said inlet and outlet, respectively, to connect the same; and a rotary mixing impeller located in the lowest portion of said tubular means adjacent said outlet for drawing through said outlet liquid from the bottom of said container and for pressing mixed liquid through said inlet along said guide face into the upper part of the container whereby liquid in the container is circulated and passes around said upright edge of said partitioning wall.

5. Container circulation arrangement comprising, in combination, a container having upright wall means and a bottom wall; an upright partitioning wall located in said container on said bottom wall and having one upright edge directly connected to a first wall portion of said wall means and another upright edge spaced from a second wall portion of said wall means remote from said first wall portion; said first wall portion of said wall means being formed on one side of said partitioning wall with an outlet and on the other side of said partitioning wall with an inlet; said bottom wall having on said one side of said partitioning wall a first surface portion extending from said other upright edge in downward direction toward said outlet, and having on said other side of said partitioning wall a second surface portion extending from said inlet in upward direction to a region in said container spaced from said other upright edge of said partitioning wall, and a third surface portion extending from the highest point of said second surface portion in downward direction to said other upright edge of said partitioning wall, said bottom wall having a fourth surface portion located in the region between said other upright edge of said partitioning wall and said second wall portion and connecting said first surface portion with said third surface portion; and mixing pump means communicating with said inlet and said outlet for drawing through said outlet liquid from the lowermost point of said first surface portion of said bottom wall of said container, and for pressing mixed liquid through said inlet along said second surface portion into a higher part of the container whereby liquid in the container is circulated in streams passing along said other side, said other upright edge, and said one side of said upright wall means.

6. Container circulation arrangement, comprising, in combination, a container having upright wall means and a bottom wall; an upright partitioning wall located in said container on said bottom wall and having one upright edge directly connected to a first wall portion of said wall means and another upright edge spaced from a second wall portion of said wall means remote from said first wall portion; said first wall portion of said wall means being formed on one side of said partitioning wall with an outlet and on the other side of said partitioning wall with an inlet located spaced in horizontal and vertical directions from said outlet and above the same; said bottom wall having on said one side of said partitioning wall a first surface portion extending from said other upright edge in downward direction toward said outlet so that said outlet is located at the lowest point of the bottom of said container, and having on said other side of said partitioning wall a second surface portion extending from said inlet in upward direction to a region in said container spaced from said second wall portion of said wall means and from said other upright edge of said partitioning wall a greater distance than from said first portion of said wall means, and a third surface portion extending from the highest point of said second surface portion in downward direction to said other upright edge of said partitioning wall, said bottom wall having a fourth surface portion located in the region between said other upright edge of said partitioning wall and said second wall portion and connecting said first surface portion with said third surface portion; a tube located outside of said container in the region of said first wall portion and being connected at the ends thereof to said inlet and outlet, respectively, to connect the same; and a rotary mixing impeller located in the lowest portion of said tube adjacent said outlet for drawing through said outlet liquid from the lowermost point of said first surface portion of said bottom wall of said container, and for pressing mixed liquid through said inlet along said second surface portion into a higher part of the container whereby liquid in the container is circulated in vertical streams and in horizontal streams passing along said other side, said other upright edge, and said one side of said upright wall means.

7. Container arrangement comprising, in combination, a container having upright wall means and a bottom wall; an upright partitioning wall located in said container on said bottom wall and having one upright edge directly connected to a first wall portion of said wall means and another upright edge spaced from a second wall portion of said wall means remote from said first wall portion; said first wall portion of said wall means being formed on one side of said partitioning wall with an outlet and on the other side of said partitioning wall with an inlet located spaced in horizontal and vertical directions from said outlet and above the same, said inlet being spaced in vertical direction a greater distance from the top of said upright wall means than from said outlet; said bottom wall having on said one side of said partitioning wall a first surface portion extending from said other upright edge in downward direction toward said outlet so that said outlet is located at the lowest point of the bottom of said container, and having on said other side of said partitioning wall a second surface portion extending from said inlet in upward direction to a region in said container spaced from said second wall portion of said wall means and from said other upright edge of said partitioning wall a gerater distance than from said first portion of said wall means, and a third surface portion extending from the highest point of said second surface portion in downward direction to said other upright edge of said partitioning wall, said bottom wall having a fourth surface portion located in the region between said other upright edge of said partitioning wall and said second wall portion and connecting said first surface portion with said third surface portion.

8. Container circulation arrangement comprising, in combination, a container having upright wall means and a bottom wall; an upright partitioning wall located in said container on said bottom wall and having one upright edge directly connected to a first wall portion of said wall means and another upright edge spaced from a second wall portion of said wall means remote from said first wall portion, said upright partitioning wall having a top edge located below the top portion of said upright wall means and above said inlet; said first wall portion of said wall means being formed on one side of said partitioning wall with an outlet and on the other side of said partitioning wall with an inlet located spaced in horizontal and vertical directions from said outlet and above the same, said inlet being spaced in vertical direction a greater distance from the top of said upright wall means than from said outlet; said bottom wall having on said one side of said partitioning wall a first surface portion extending from said other upright edge in downward direction toward said outlet so that said outlet is located at the lowest point of the bottom of said container, and having on said other side of said partitioning wall a second surface portion extending from said inlet in upward direction to a region in said container spaced from said second wall portion of said wall means and from said other upright edge of said partitioning wall a greater distance than from said first portion of said wall means, and a third surface portion extending from the highest point of said second surface portion in downward direction to said other upright edge of said partitioning wall, said bottom wall having a fourth surface portion located in the region between said other upright edge of said partitioning wall and said second wall portion and connecting said first surface portion with said third surface portion; a tube located outside of said container in the region of said first wall portion and being connected at the ends thereof to said inlet and outlet, respectively, to connect the same; a rotary mixing impeller located in the lowest portion of said tube adjacent said outlet for drawing through said outlet liquid from the lowermost point of said first surface portion of said bottom wall of said container, and for pressing mixed liquid through said inlet along said second surface portion into a higher part of the container whereby liquid in the container is circulated in vertical streams and in horizontal streams passing along said other side, said other upright edge, and said one side of said upright wall mean; a manually operated closure valve located in said tube intermediate said impeller and said outlet; pipe means connected to said tube adjacent said impeller on the side of the impeller remote from said outlet; a reversible pump connected to said pipe means; and another manually operated closure valve located between said pump and said tube whereby liquid can be selectively supplied by said pump through said inlet of said container, and removed by said reversible pump in mixed condition through said outlet by operation of said closure valves and said reversible pump.

9. Container arrangement comprising, in combination, a container having wall means including a bottom and being formed with an inlet and an outlet, said outlet being located at the level at the lowest portion of said bottom, and said inlet being located spaced at least in horizontal direction from said outlet; an upright partitioning wall located in said container intermediate said inlet and outlet and having a top portion located above said inlet, said upright partitioning wall having an upright edge remote from said inlet and said outlet and spaced from said wall means; and guide means located in said container on the side of said partitioning wall at which said inlet is located, said guide means having a guide face extending from said inlet in upward direction along said partitioning wall so that liquid drawn from said outlet and pressed through said inlet into said container passes along said guide face into the upper part of the container and around said upright edge of said partitioning wall.

10. A container arrangement comprising a container having wall means including a bottom wall and upright walls and being formed with an inlet and an outlet, said inlet and said outlet being spaced from each other at least in horizontal and vertical directions, said inlet being located above said outlet, said wall means defining a space for a continuous body of liquid, said bottom wall having a first guide face extending from said inlet in upward direction into said space, and a second guide face extending from the highest point of said first guide face in downward direction toward said outlet; a tube located outside of said container and being connected at the ends thereof to said inlet and outlet; pump means located in the lowest portion of said tube adjacent said outlet for drawing liquid from said outlet and for pressing liquid through said inlet along said first guide face in the upper part of the container; a manually operated valve located in said tube intermediate said pump means and said outlet; pipe means connected to said tube adjacent said pump means on the side of the same remote from said outlet; a reversible pump means connected to said pipe means; and another manually operated valve located between said reversible pump means and said tube in said pipe means whereby liquid can be selectively supplied by said reversible pump means through said inlet of said container, and removed by said reversible pump means through said outlet by operation of said valves and said reversible pump means.

11. Container circulation arrangement comprising, in combination, a container including a bottom wall, upright outer walls, and an upright partitioning wall attached to one portion of said upright outer walls and having an upright edge spaced from another portion of said upright outer walls said walls defining two communicating spaces for a continuous body of liquid, said bottom wall having a first guide face extending in upward direction on one side and along said partitioning wall toward said upright edge, and a second guide face extending in downward direction from said upright edge toward said one portion along said partitioning wall on the other side of the same; and pump means for pressing liquid along said first guide face toward the upper part of said container and around said upright edge, and for drawing liquid from the lower portion of said second guide face whereby the liquid is circulated in said container.

12. A container circulation arrangement as set forth in claim 11 wherein said partitioning wall has an upper edge located below the upper edges of said outer walls.

References Cited in the file of this patent

UNITED STATES PATENTS

| | | |
|---|---|---|
| 626,950 | Wheelwright | June 13, 1899 |
| 1,438,733 | Werner | Dec. 12, 1922 |
| 2,068,356 | Soderholm | Jan. 19, 1937 |
| 2,229,597 | Milligan | Jan. 21, 1941 |